E. W. KNOWLTON.
BREAD CUTTING MACHINE.
APPLICATION FILED MAR. 23, 1921.
1,418,874.
Patented June 6, 1922.
3 SHEETS—SHEET 1.
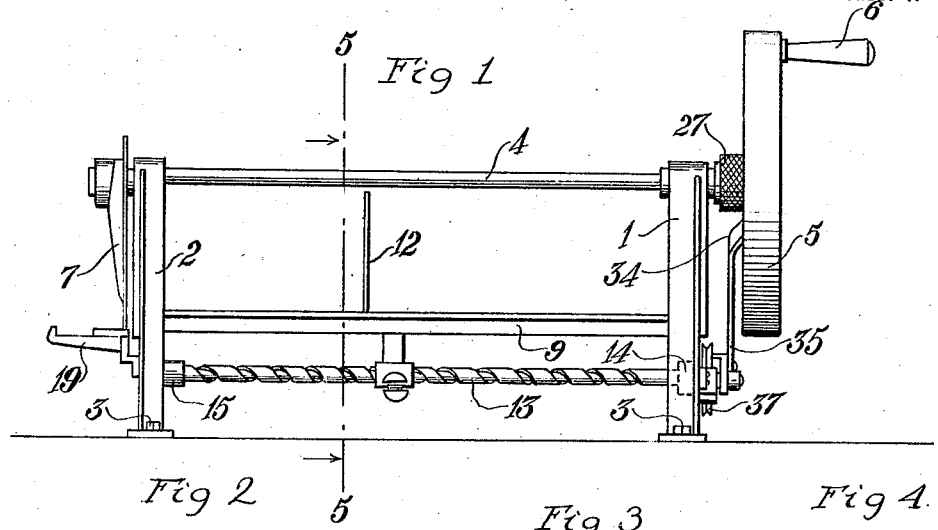
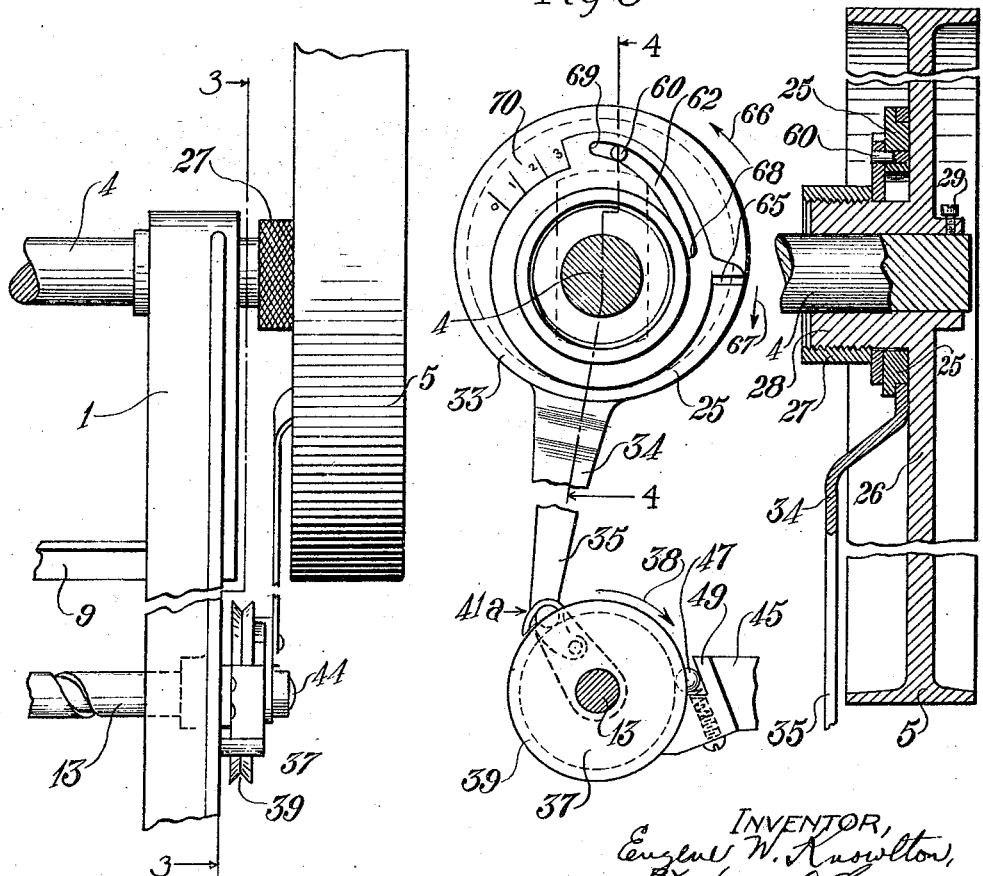
INVENTOR,
Eugene W. Knowlton,
BY Henry J. Lucke,
his ATTORNEY.

E. W. KNOWLTON.
BREAD CUTTING MACHINE.
APPLICATION FILED MAR. 23, 1921.
1,418,874.
Patented June 6, 1922
3 SHEETS—SHEET 2.
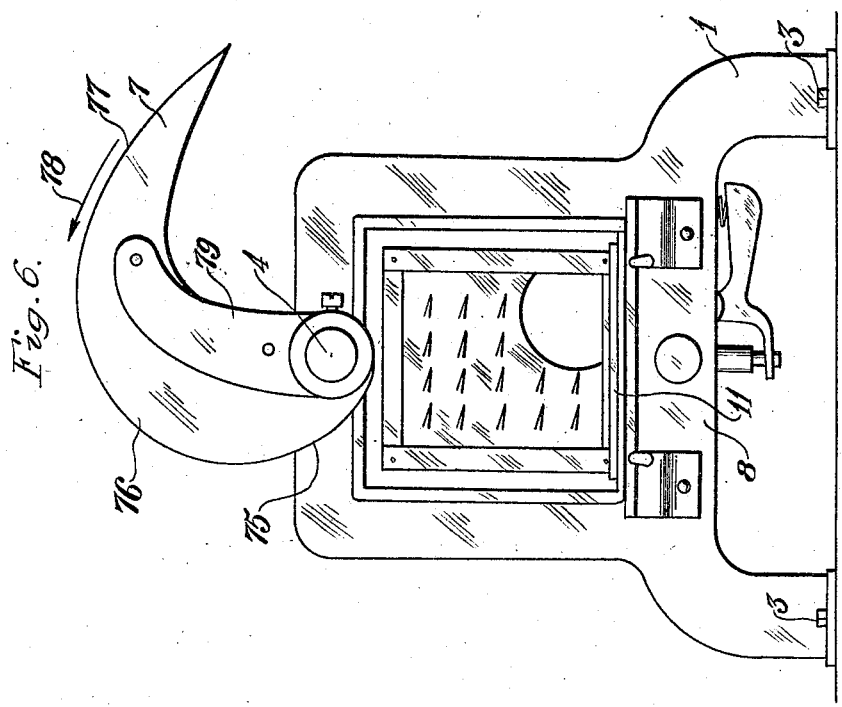
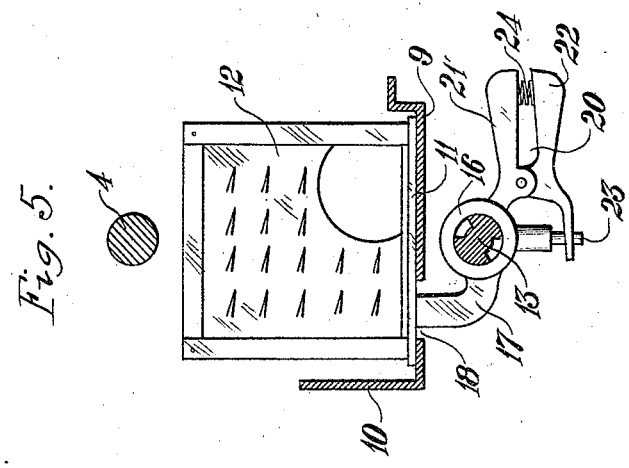

E. W. KNOWLTON.
BREAD CUTTING MACHINE.
APPLICATION FILED MAR. 23, 1921.
1,418,874.
Patented June 6, 1922.
3 SHEETS—SHEET 3.
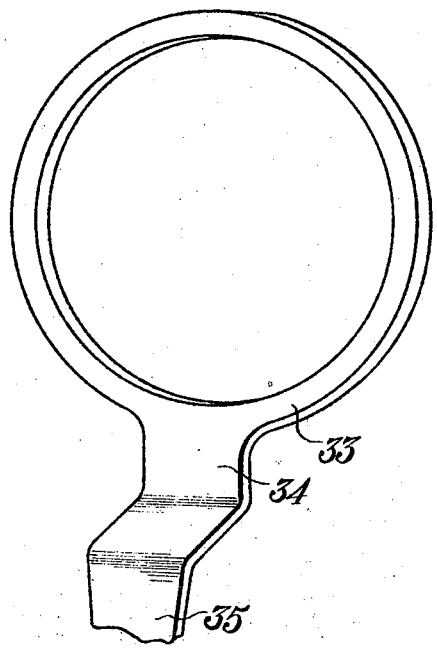
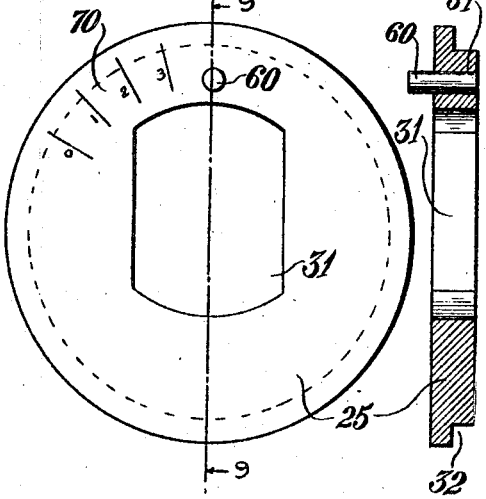
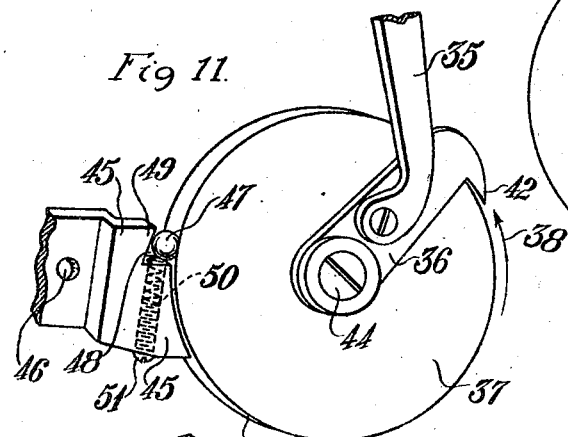
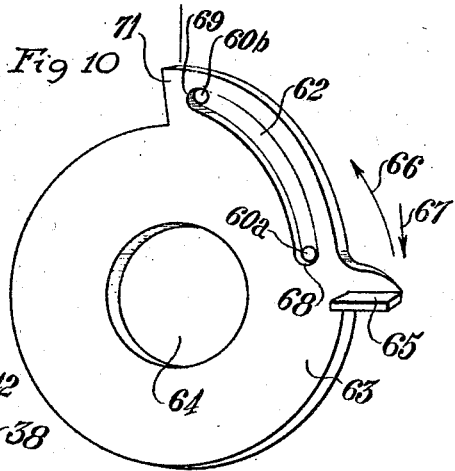
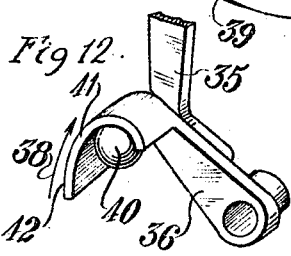

UNITED STATES PATENT OFFICE.

EUGENE W. KNOWLTON, OF BUFFALO, NEW YORK, ASSIGNOR TO JOHN E. SMITH'S SONS COMPANY, A CORPORATION OF NEW YORK.

BREAD-CUTTING MACHINE.

1,418,874.  Specification of Letters Patent.  Patented June 6, 1922.

Application filed March 23, 1921. Serial No. 454,696.

*To all whom it may concern:*

Be it known that I, EUGENE W. KNOWLTON, a citizen of the United States of America, residing at Buffalo, county of Erie, State of New York, have invented certain new and useful Improvements in Bread-Cutting Machines, of which the following is a specification.

This invention relates to bread cutting machines.

More particularly, the invention is directed to a bread cutting machine provided with improved operating means for effecting the cutting of the slices of bread without waste. A further object of the invention is to provide improved means for supporting and feeding the loaf of bread.

A further and more particular object of the invention is to provide improved means for more readily adjusting the thickness of the bread slices.

In accordance with the most approved forms of the invention, my bread slicing machine embodies a crank momentum wheel, a slicing knife directly actuated by a shaft of the momentum wheel, such knife having an improved construction for severing the slices with minimum friction and waste in slicing; a slide on which the bread loaf is supported and means for feeding the slide, and comprising a screw shaft, mechanism operated by the knife shaft for intermittently operating the screw shaft in a positive manner, means for adjusting such mechanism for regulating the extent of effective feed of the screw shaft during a non-slicing period of operation of the knife, and manual means for disconnecting the loaf supporting slide from the feed screw shaft.

Further features and objects of the invention will be more fully understood from the following detail description and the accompanying drawings, in which—

Fig. 1 is a side elevation of an approved form of the invention;

Fig. 2 is a detail side elevation of the momentum wheel, the main operating shaft and intermittent feed mechanism, partly broken away, and on an enlarged scale;

Fig. 3 is a sectional elevation on line 3—3 of Fig. 2;

Fig. 4 is a sectional elevation on line 4—4 of Fig. 3;

Fig. 5 is a sectional elevation on line 5—5 of Fig. 1 on a somewhat enlarged scale;

Fig. 6 is an end elevation of the slicing knife and appurtenant elements on a greatly enlarged scale;

Fig. 7 is a detail perspective view of the driving collar and reciprocating member of the adjustable intermittent feed mechanism;

Fig. 8 is a front elevation of the scale marked plate of the adjustable intermittent mechanism;

Fig. 9 is a sectional elevation on line 9—9 of Fig. 8;

Fig. 10 is a perspective view of the adjusting plate of the adjustable intermittent mechanism;

Fig. 11 is a perspective view of the operated part of the adjustable mechanism; and Fig. 12 is a perspective view on a greatly enlarged scale of the preferred form of connection of the reciprocating member with the screw-shaft.

Referring to the drawings, the bread cutter machine is preferably of the open frame type and comprises the oppositely disposed end standards 1, 2, and having openings for receiving the set bolts 3. Between the standards 1, 2, extends the main shaft 4 carrying at its anterior end the momentum wheel 5 provided with the crank handle 6 and at its posterior end the knife blade 7. The bearings for the shaft 4 are shown as integral with the upper portions of the standards 1, 2.

The horizontal arms 8 of the respective frame standards 1, 2, as indicated in Fig. 6, serve to support the forward guide plate 9 and the rearward guide plate 10, which are suitably bolted or otherwise fixed to the standards 1, 2. On the forward and rearward guide plates 9, 10, is located the slide support 11 for receiving the loaf of bread. Such slide support 11 is provided with upright plate 12 to contact with the extreme end of the bread loaf.

The movement of the slide 11 is controlled by means of the worm shaft 13, rotatably mounted in the oppositely disposed fixed bearings 14, 15, carried in the arms 8 of the respective standards 1, 2. The worm-shaft 13 meshes with the nut member 16 carried by the arm 17 fixed to the slide 11 and passing through the slot or clearance 18 between the forward guide plate 9 and the rearward guide plate 10.

Posterior of the standard 2 is provided the shelf 19 for receiving the severed slices of bread.

Suitable means are provided for releasing the nut member 16 from meshing relation with the worm-shaft 13 and for this purpose I have provided the spring pressed gripper 20 comprising the upper manipulating member 21 to which is pivoted the lower manipulating member 22, the latter pivotally carrying the pin 23. The expansive spring 24 positioned between the upper and lower manipulating members 21, 22 normally holds the pin 23 in its upward position to effect meshing engagement in the groove of the worm-shaft 13. Upon manually pressing the lower manipulating member 22 upwardly, the pin 23 is depressed and removed from meshing relation with the groove of the worm-shaft 13, whereupon the slide 11 may be moved toward the anterior portion of the bread cutting machine, as when replacing a bread loaf or for inspection or under other circumstances.

Connected to the anterior end of the worm-shaft 13 I provide suitable actuating means, driven from the main shaft of the bread cutting machine and constructed to rotate the worm-shaft during the non-cutting range of the rotation of the knife 7, and adjustable connection for regulating the thickness of the bread slices. For such purpose I have provided the eccentric disk 25, shown enlarged and in assembled view in Figs. 3 and 4, and shown in separate detail in Figs. 8 and 9. Such eccentric disk 25 is retained in frictional engagement with the inner face of the web 26 of the momentum wheel 5 by means of the knurled locking collar 27, in threaded engagement with the hub 28 of the momentum wheel 5. As is indicated in Fig. 4, the hub 28 of the momentum wheel 5 may be secured to the main shaft 4 by means of the set screw 29.

The eccentric disk 25 is shown separately in plan view in Fig. 8 and in central sectional view in Fig. 9 and is provided with a central opening 31 of a width slightly exceeding the diameter of the main shaft 14 and of a length greatly exceeding the diameter of the shaft 4 for the purpose of allowing a sufficient extent of throw of the eccentric disk 25 in its actuating movement of the worm-shaft 13, as is set forth more particularly hereinafter.

Such eccentric disk 25 is curved circularly at 32 to receive the ring 33 of the oscillating driving member 34 having a lower offset arm 35, see Figs. 3, 7 and 11. The arm 35 is pivotally connected to the rotating arm 36 for actuating the disk 37 fixed at the anterior end of the worm-shaft 13 for intermittently driving the worm-shaft for a regulated extent in the direction of the arrow 38, during the non-slicing stage of rotation of the knife 7.

Such disk 37 is preferably grooved at its periphery 39 to receive a spherical ball or roller 40, see particularly Figs. 3 and 12, and also Figs. 11 and 1, said ball cooperating with the flaring cup 41 of the oscillatory, rotating arm 36 whereby the upward stroke of the arm 36, actuated by the oscillating member 35, the ball 40 is wedged between the flaring portion 42 of the cup 41 and the periphery of the groove 39 to cause the disk 37 and the worm-shaft 13 to be intermittently rotated in a continuous direction, indicated by the arrow 38. The disk 37 may be fixed to the end of the worm-shaft 13 by means of the set screw 44.

During the downward stroke of the oscillating member 35, the ball 40 is automatically released from mutual engagement with the cup 41 and the disk 37 and without any friction and without any noise, as is the case with ratchet arrangements of prior construction.

As is indicated in Figs. 3 and 11, I also provide a brake, preferably of the silent type, for locking the disk 37 against rotation counter to its operative direction indicated by the arrow 38. As one such braking means I have shown the cup member 45 fixed to any suitable support as by means of a set screw passing through its recess 46, such cup 45 receiving the locking ball 47 in the cup opening 48. The cup opening 48 is shaped to have its end portion 49 flaring toward the periphery of the disk 37, so that in the event of the disk 37 being rotated counter to the direction of the arrow 38, the ball 47 will be locked between the flared end portion 49 and the periphery of the disk 37. The brake is made adjustable by the provision of the adjustable screw 50 having its slotted end 51 extending exteriorly and readily accessible for adjustment by means of a screw driver. It will be noted that the screw 50 extends through a recess to the bottom of the cup 48 whereby upon moving the screw inwardly the effective bottom of the cup opening 48 is elevated, to thereby raise the ball 47, as under circumstances of initial adjustment, taking up wear of the ball and like purposes.

Preferably, the oscillating driving connection between the main shaft 4 and the worm shaft 13 is made adjustable, and to this end I provide a pin 60 seated in a suitable recess 61 in the eccentric member 25. Such pin 61 extends into the slot 62 of a member 63, provided with the central opening 64 for mounting onto the shaft 4. The slot 62 extends eccentrically relative to the longitudinal axis of the shaft 4, that is to say, eccentrically relative to the centre of the circular opening 64, as is shown in Fig. 10. The setting member is provided with the finger piece 65, whereby the setting member 63 may be manually turned either in the direction indicated by the arrow 66 or the counter direction indicated by the arrow 67. When the setting member 63 is moved so that the pin 60 is in the position shown at 60$^a$, in contact with the extreme end 68 of the slot 62, the effective eccentricity of the eccentric member 25 is decreased so that the oscillating member 35 is moved through a minimum stroke. Similarly, when the pin 60 attains the position indicated in Fig. 10 at 60$^b$, in engagement with the opposite end 69 of the slot 62, the effective eccentricity of the eccentric member 25 is increased so that the oscillating member 35 is moved through a maximum stroke.

As a convenient and ready means for indicating the effective stroke of the oscillating member 35, and therewith the effective extent of rotation of the wormshaft 33 and feed of the loaf of bread on the support 11, I have provided for the scale indications shown at 70 on the exposed face of the eccentric member 25 and a marker in the form of the straight line edge 71. The indications are marked respectively "0", 1, 2, 3, but such indications may be arranged to show the actual thickness of the bread slice or the number of slices for any selected length of bread loaf, or other form of suitable indication.

As is shown in Fig. 3, upon moving the setting member 63 in the direction of the arrow 66, see Figs. 3 and 10, the pin 60 is moved away from the shaft 4, thereby elevating the eccentric member 25 and increasing the effective eccentricity of the eccentric member 25 relative to the shaft 4.

When it is desired to change the setting of the thickness of the bread slice, the knurled nut 27 is unloosened, to release the setting member 63, and upon the member 63 being set, the knurled nut 27 is again tightened, thus locking the setting member 63 and also locking the eccentric disk 25 relative to the shaft 4.

Preferably, the slicing knife 7 is constructed to engage with a minimum resistance in initially severing and passing progressively through the bread loaf in slicing therefrom a bread slice, and I have discovered that such result is obtained by shaping the knife at its heel portion 75 to have its slicing or cutting edge thereof to extend in a direction substantially in the direction of the shaft 4, such slicing edge of the heel portion extending in the opposite increasingly away from the shaft 4; the slicing edge of the central portion 76 extending at a greater rate away from the shaft 4 and the slicing edge of the free end 77 of the knife extending at a still greater rate away from the shaft 4. Thus, upon rotation of the shaft 4 and the knife 7 in the direction of the arrow 78, corresponding to clockwise rotation of the handle 6, see Fig. 1, the initial contact of the heel portion of the slicing edge engages the bread loaf without crushing the bread and the knife penetrates progressively and with a shearing action through the bread without crushing and without causing any waste.

The forward or outer face of the knife 7 is provided with the plate 79 which is outwardly flaring rearwardly of the plate 79, to move forward the slice as progressively sliced toward the delivery tray 19.

From the above it will be observed that I have provided a bread slicing machine of marked simplicity of construction and adjustment.

Such plate 79 serves also as reinforcing means and enables a thinner blade of knife to be used.

The actuating parts of the machine are arranged to provide for positive driving of the slicing knife and in a continuous rotative direction and to positively feed the support of the bread loaf toward the path of movement of the knife during the non-slicing stage of the knife.

It will also be observed that the operating parts are arranged for coaction with minimum friction and without any noise. The adjustment mechanism for regulating the thickness of the bread slices is arranged to be readily set, and it will be understood that the indicating means is substantially at rest during the operation of the machine so that the indication of the thickness of the bread slice for any setting can be readily observed.

Whereas I have described my invention by reference to specific forms thereof, it will be understood that many changes and modifications may be made without departing from the spirit of the invention, as defined by the appended claims.

I claim—

1. A bread slicing machine comprising an operating shaft, slicing means driven thereby, a slidable support for a loaf of bread and adjustable means for moving said support, said adjustable means comprising an eccentric member extending about said shaft, an oscillating member driven by said eccentric member, a pin carried by said eccentric member and a setting member provided with a slot for receiving said pin.

2. A bread slicing machine comprising an operating shaft, sliding means driven thereby, a slidable support for a loaf of bread and adjustable means for moving said support, said adjustable means comprising a substantially circular eccentric member extending about said shaft, an oscillating member driven by said eccentric member, a pin carried by said eccentric member and a setting member provided with a slot extending eccentrically relatively to the axis of said shaft.

3. A bread slicing machine comprising an operating shaft, slicing means driven thereby, a slidable support for a loaf of bread and adjustable means for moving said support, said adjustable means comprising an eccentric member extending about said shaft, an oscillating member driven by said eccentric member, a pin carried by said eccentric member and a setting member provided with a slot for receiving said pin and scaled indications disposed on one of said members.

4. A bread slicing machine comprising an operating shaft, slicing means driven thereby, a slidable support for a loaf of bread and adjustable means for moving said support, said adjustable means comprising a substantially circular eccentric member extending about said shaft, an oscillating member driven by said eccentric member, a pin carried by said eccentric member and a setting member provided with a slot extending eccentrically relative to the axis of said shaft and scaled indications disposed on one of said members.

5. A bread slicing machine comprising an operating shaft, slicing means driven by said shaft, a support for a loaf of bread, means for intermittently moving said support toward said slicing means, said intermittently moving means comprising a worm shaft, a releasable connection between said worm shaft and said support, and adjustable means for rotating said worm shaft comprising a grooved disk fixed to said worm shaft, an oscillating member, and a ball connection between said oscillating member and said grooved disk whereby said worm shaft is intermittently rotated by said oscillating member.

In testimony whereof I have signed this specification this 5th day of March, 1921.

EUGENE W. KNOWLTON